(12) United States Patent
Harkins et al.

(10) Patent No.: US 10,743,535 B2
(45) Date of Patent: Aug. 18, 2020

(54) INSECTICIDE FOR FLIGHT-CAPABLE PESTS

(71) Applicants: Alexander J. Harkins, Oley, PA (US); Stephen C. Hahn, Mount Penn, PA (US)

(72) Inventors: Alexander J. Harkins, Oley, PA (US); Stephen C. Hahn, Mount Penn, PA (US)

(73) Assignee: H&K SOLUTIONS LLC, Oley, PA (US)

( * ) Notice: Subject to any disclaimer, the term of this patent is extended or adjusted under 35 U.S.C. 154(b) by 0 days.

(21) Appl. No.: 16/105,269

(22) Filed: Aug. 20, 2018

(65) Prior Publication Data

US 2019/0053486 A1 Feb. 21, 2019

Related U.S. Application Data

(60) Provisional application No. 62/689,067, filed on Jun. 23, 2018, provisional application No. 62/605,576, filed on Aug. 18, 2017.

(51) Int. Cl.
*A01N 31/06* (2006.01)
*A01N 65/22* (2009.01)
*A01N 25/04* (2006.01)

(52) U.S. Cl.
CPC ............ *A01N 31/06* (2013.01); *A01N 25/04* (2013.01); *A01N 65/22* (2013.01)

(58) Field of Classification Search
CPC ......... A01N 31/06; A01N 25/04; A01N 65/22
USPC ........................................................ 514/729
See application file for complete search history.

(56) References Cited

U.S. PATENT DOCUMENTS

| | | |
|---|---|---|
| 3,713,404 A | 1/1973 | Lavo |
| 3,717,452 A | 2/1973 | Gibsen |
| 3,718,454 A | 2/1973 | Albrecht |
| 3,912,816 A | 10/1975 | Hofmann |
| 3,968,298 A | 7/1976 | Reinert |
| 3,971,810 A | 7/1976 | Reusser |
| 4,001,379 A | 1/1977 | Turk |
| 4,059,698 A | 11/1977 | Pinamonti |
| 4,105,780 A | 8/1978 | Berkelhammer |
| 4,110,345 A | 8/1978 | Berkelhammer |
| 4,116,998 A | 9/1978 | Makinson |
| 4,133,878 A | 1/1979 | Gough |
| 4,180,508 A | 12/1979 | Becker |
| 4,212,870 A | 7/1980 | Gibbs |
| 4,225,693 A | 9/1980 | McCormick |
| 4,258,207 A | 3/1981 | Roman |
| 4,271,186 A | 6/1981 | Foerster |
| 4,289,897 A | 9/1981 | Krueger |
| 4,299,843 A | 11/1981 | Tieman |
| 4,401,456 A | 8/1983 | Connick, Jr. |
| 4,517,367 A | 5/1985 | Skoetsch |
| 4,518,593 A | 5/1985 | Juvin |
| 4,663,463 A | 5/1987 | Kunz |
| 4,774,090 A | 9/1988 | Fekete |
| 4,956,180 A | 9/1990 | Cassani |
| 4,962,109 A | 10/1990 | McDonald |
| 4,978,623 A | 12/1990 | Walfield |
| 5,004,749 A | 4/1991 | Jerusik |
| 5,013,748 A | 5/1991 | Radtke |
| 5,037,654 A | 8/1991 | Puritch |
| 5,104,873 A | 4/1992 | Nowak |
| 5,124,349 A | 6/1992 | Carter |
| 5,152,823 A | 10/1992 | Albrecht |
| 5,180,587 A | 1/1993 | Moore |
| 5,250,499 A | 10/1993 | Narayanan |
| 5,262,438 A | 11/1993 | Benoit |
| 5,283,229 A | 2/1994 | Narayanan |
| 5,314,687 A | 5/1994 | Oakes |
| 5,322,949 A | 6/1994 | Heinemann |
| 5,344,652 A | 9/1994 | Hall, II |
| 5,354,565 A | 10/1994 | Iwasaki |
| 5,354,726 A | 10/1994 | Narayanan |
| 5,385,948 A | 1/1995 | Chaudhuri |
| 5,409,885 A | 4/1995 | Derian |
| 5,411,992 A | 5/1995 | Eini |
| 5,417,968 A | 5/1995 | Staats |
| 5,424,079 A | 6/1995 | Yu |
| 5,445,945 A | 8/1995 | Drechsler |
| 5,462,943 A | 10/1995 | Seitz |
| 5,474,972 A | 12/1995 | Sheen |
| 5,475,090 A | 12/1995 | Granados |
| 5,478,797 A | 12/1995 | Gironda |
| 5,484,760 A | 1/1996 | Bussler |
| 5,514,639 A | 5/1996 | Fisher |
| 5,516,514 A | 5/1996 | Iizuka |
| 5,529,772 A | 6/1996 | Lebo, Jr. |

(Continued)

FOREIGN PATENT DOCUMENTS

| | | |
|---|---|---|
| WO | 8300799 | 3/1983 |
| WO | 8700400 | 1/1987 |
| WO | 8800197 | 1/1988 |
| WO | 9000007 | 1/1990 |
| WO | 1991008665 | 6/1991 |
| WO | 1991009831 | 7/1991 |
| WO | 1991016820 | 11/1991 |
| WO | 1992011761 | 7/1992 |
| WO | 1992016109 | 10/1992 |

(Continued)

*Primary Examiner* — Kevin E Weddington
(74) *Attorney, Agent, or Firm* — FisherBroyles LLP

(57) ABSTRACT

An insecticide for exterminating a flight-capable insect, comprising an effective concentration of menthol to be lethal to the insect, a solvent for the menthol, at least one viscosity-increasing agent in sufficient concentration to increase viscosity of insecticide to greater than 5 centipoise, at least one surfactant in sufficient concentration to cause adhesion of insecticide to insect, and a volumizer.

14 Claims, No Drawings

(56) References Cited

U.S. PATENT DOCUMENTS

| | | |
|---|---|---|
| 5,550,157 A | 8/1996 | Vegega |
| 5,556,881 A | 9/1996 | Grahn Marisi |
| 5,580,567 A | 12/1996 | Roberts |
| 5,580,974 A | 12/1996 | Banker |
| 5,629,469 A | 5/1997 | Deluca-Flaherty |
| 5,641,726 A | 6/1997 | Walker |
| 5,665,349 A | 9/1997 | Levings, III |
| 5,674,514 A | 10/1997 | Hasslin |
| 5,690,950 A | 11/1997 | Beadle |
| 5,730,996 A | 3/1998 | Beall |
| 5,747,416 A | 5/1998 | McArdle |
| 5,753,615 A | 5/1998 | Thorpe |
| 5,798,112 A | 8/1998 | Heitz |
| 5,827,522 A | 10/1998 | Nowak |
| 5,849,870 A | 12/1998 | Warren |
| 5,851,546 A | 12/1998 | Mashelkar |
| 5,866,151 A | 2/1999 | Holl |
| 6,048,542 A | 4/2000 | Eagles |
| 6,057,491 A | 5/2000 | Cigan |
| 6,077,937 A | 6/2000 | Payne |
| 6,083,457 A | 7/2000 | Parkinson |
| 6,090,855 A | 7/2000 | Walker |
| 6,093,422 A | 7/2000 | Denkewicz, Jr. |
| 6,107,279 A | 8/2000 | Estruch |
| 6,150,165 A | 11/2000 | Payne |
| 6,197,098 B1 | 3/2001 | Narayanan |
| 6,204,057 B1 | 3/2001 | Schnetter |
| RE37,313 E | 8/2001 | Roberts |
| 6,274,570 B1 | 8/2001 | Vogt |
| 6,277,823 B1 | 8/2001 | Kramer |
| 6,284,286 B1 | 9/2001 | Arimoto |
| 6,350,724 B1 | 2/2002 | Kiel |
| 6,358,883 B1 | 3/2002 | Wood |
| 6,372,242 B1 | 4/2002 | Gutierrez |
| 6,384,302 B1 | 5/2002 | Chen |
| 6,429,360 B1 | 8/2002 | Estruch |
| 6,468,953 B1 | 10/2002 | Hitchens |
| 6,538,013 B2 | 3/2003 | Goebel |
| 6,543,181 B1 | 4/2003 | Baker |
| 6,544,927 B2 | 4/2003 | Burns |
| 6,582,712 B2 | 6/2003 | Pullen |
| 6,586,470 B1 | 7/2003 | Lojek |
| 6,656,908 B2 | 12/2003 | Feitelson |
| 6,663,860 B1 | 12/2003 | Tvedten |
| 6,689,395 B2 | 2/2004 | Bessette |
| 6,720,167 B1 | 4/2004 | Federici |
| 6,780,408 B1 | 8/2004 | Bosch |
| 6,797,490 B2 | 9/2004 | Bulla, Jr. |
| 6,831,038 B2 | 12/2004 | Volgas |
| 6,890,545 B2 | 5/2005 | Ohhira |
| 6,890,886 B2 | 5/2005 | Policello |
| 6,969,522 B2 | 11/2005 | Bessette |
| 6,982,097 B2 | 1/2006 | Mingzhong |
| 7,037,494 B2 | 5/2006 | Mattingly |
| 7,074,459 B2 | 7/2006 | Stockel |
| 7,122,176 B2 | 10/2006 | Stamets |
| 7,129,212 B2 | 10/2006 | Narva |
| 7,194,964 B2 | 3/2007 | Tidow |
| 7,238,726 B2 | 7/2007 | Bessette |
| 7,294,341 B2 | 11/2007 | Pullen |
| 7,378,493 B2 | 5/2008 | Shen |
| 7,393,528 B2 | 7/2008 | Tvedten |
| 7,402,708 B2 | 7/2008 | Giselbrecht |
| 7,465,469 B2 | 12/2008 | Ben-Yehoshua |
| 7,494,662 B2 | 2/2009 | Reaney |
| 7,544,502 B2 | 6/2009 | Tanaka |
| 7,569,517 B2 | 8/2009 | Fischer |
| 7,579,017 B2 | 8/2009 | Murphy |
| 7,727,933 B2 | 6/2010 | Fischer |
| 7,820,594 B2 | 10/2010 | Coleman |
| 7,888,471 B2 | 2/2011 | Lambert |
| 7,897,543 B2 | 3/2011 | Bretschneider |
| 7,931,910 B2 | 4/2011 | Parker |
| 7,972,635 B2 | 7/2011 | Seabrook, Jr. |
| 8,017,632 B2 | 9/2011 | Fischer |
| 8,084,452 B2 | 12/2011 | Jeschke |
| 8,101,408 B2 | 1/2012 | Taylor |
| 8,119,588 B2 | 2/2012 | Bernhardt |
| 8,133,869 B2 | 3/2012 | Lopretti |
| 8,153,145 B2 | 4/2012 | Staetz |
| 8,168,832 B2 | 5/2012 | Fischer |
| 8,202,875 B2 | 6/2012 | Fischer |
| 8,252,719 B2 | 8/2012 | Douglass |
| 8,252,721 B2 | 8/2012 | Bettarini |
| 8,383,548 B2 | 2/2013 | Dexter |
| 8,383,640 B2 | 2/2013 | Liu |
| 8,426,342 B2 | 4/2013 | Kilian |
| 8,492,314 B2 | 7/2013 | Greyling |
| 8,629,086 B2 | 1/2014 | Pullen |
| 8,647,684 B2 | 2/2014 | Baube |
| 8,734,867 B2 | 5/2014 | Huang |
| 8,791,054 B2 | 7/2014 | Deville |
| 8,865,226 B2 | 10/2014 | Bobbert |
| 8,911,756 B2 | 12/2014 | Beitzel |
| 8,946,124 B2 | 2/2015 | Bretschneider |
| 8,956,634 B2 | 2/2015 | Xin |
| 8,980,294 B2 | 3/2015 | Burke |
| 9,044,012 B2 | 6/2015 | Borzatta |
| 9,198,428 B2 | 12/2015 | Ross, Jr. |
| 9,198,432 B2 | 12/2015 | Giencke |
| 9,204,640 B2 | 12/2015 | Bojack |
| 9,259,003 B2 | 2/2016 | Fischer |
| 9,307,692 B2 | 4/2016 | Boday |
| 9,339,039 B1 | 5/2016 | Martin |
| 9,510,590 B2 | 12/2016 | Storm |
| 9,560,847 B2 | 2/2017 | Narayanan |
| 9,578,883 B2 | 2/2017 | Mathis |
| 9,668,471 B2 | 6/2017 | Parrish |
| 9,770,026 B2 | 9/2017 | Liu |
| 2001/0019728 A1 | 9/2001 | Basinger |
| 2002/0018820 A1 | 2/2002 | Pullen |
| 2002/0023702 A1 | 2/2002 | Kettler |
| 2002/0028256 A1 | 3/2002 | Bessette |
| 2002/0055436 A1 | 5/2002 | Krause |
| 2002/0146394 A1 | 10/2002 | Stamets |
| 2002/0160915 A1 | 10/2002 | Windsor |
| 2002/0160916 A1 | 10/2002 | Volgas |
| 2002/0183205 A1 | 12/2002 | Burns |
| 2002/0193250 A1 | 12/2002 | Bessette |
| 2003/0035852 A1 | 2/2003 | Pullen |
| 2003/0036530 A1 | 2/2003 | Bessette |
| 2003/0054185 A1 | 3/2003 | Ottersbach |
| 2003/0054391 A1 | 3/2003 | Bulla |
| 2003/0068304 A1 | 4/2003 | Mattingly |
| 2003/0091661 A1 | 5/2003 | Bessette |
| 2003/0108582 A1* | 6/2003 | Willis ............ A01N 65/00 424/405 |
| 2004/0000660 A1 | 1/2004 | Li |
| 2004/0048748 A1 | 3/2004 | Friend |
| 2004/0091514 A1 | 5/2004 | Tvedten |
| 2004/0116290 A1 | 6/2004 | Pena |
| 2004/0128716 A1 | 7/2004 | Narva |
| 2004/0234492 A1 | 11/2004 | Stockel |
| 2004/0234496 A1 | 11/2004 | Stockel |
| 2004/0242428 A1 | 12/2004 | Pullen |
| 2004/0259732 A1 | 12/2004 | Asrar |
| 2004/0265459 A1 | 12/2004 | Lark |
| 2005/0026780 A1 | 2/2005 | Parrish |
| 2005/0043182 A1 | 2/2005 | Douglass |
| 2005/0172355 A1 | 8/2005 | Tanaka |
| 2005/0210545 A1 | 9/2005 | Shen |
| 2005/0271693 A1 | 12/2005 | Martin |
| 2006/0105007 A1 | 5/2006 | Narayanan |
| 2006/0199870 A1 | 9/2006 | Giselbrecht |
| 2007/0020304 A1 | 1/2007 | Tamarkin |
| 2007/0021304 A1 | 1/2007 | Lin |
| 2007/0053866 A1 | 3/2007 | Abou-Nemeh |
| 2007/0053898 A1 | 3/2007 | Payton |
| 2007/0098750 A1 | 5/2007 | Bessette |
| 2007/0122437 A1 | 5/2007 | Hougard |
| 2007/0129252 A1 | 6/2007 | Fischer |
| 2007/0148202 A1 | 6/2007 | Primo Yufera |
| 2007/0149404 A1 | 6/2007 | Huff |
| 2007/0154565 A1 | 7/2007 | Zaghmout |

(56) References Cited

U.S. PATENT DOCUMENTS

| | | |
|---|---|---|
| 2007/0178128 A1 | 8/2007 | Bessette |
| 2007/0190094 A1 | 8/2007 | Bessette |
| 2007/0196412 A1 | 8/2007 | Karl |
| 2007/0244007 A1 | 10/2007 | Fischer |
| 2007/0249699 A1 | 10/2007 | Coleman |
| 2007/0298131 A1 | 12/2007 | Bessette |
| 2007/0298969 A1 | 12/2007 | Fischer |
| 2008/0140036 A1 | 6/2008 | Buck |
| 2008/0146444 A1 | 6/2008 | Fabri |
| 2008/0187607 A1 | 8/2008 | Bessette |
| 2008/0200499 A1 | 8/2008 | Fischer |
| 2008/0214400 A1 | 9/2008 | Pullen |
| 2008/0221167 A1 | 9/2008 | Fischer |
| 2008/0261810 A1 | 10/2008 | Fischer |
| 2008/0293676 A1 | 11/2008 | Fischer |
| 2008/0317800 A1 | 12/2008 | Amirzadeh-Asl |
| 2009/0012100 A1 | 1/2009 | Fischer |
| 2009/0029857 A1 | 1/2009 | Meazza |
| 2009/0093443 A1 | 4/2009 | Kempen |
| 2009/0110754 A1 | 4/2009 | Stevenson |
| 2009/0118367 A1 | 5/2009 | Steward |
| 2009/0143454 A1 | 6/2009 | Maurer |
| 2009/0170935 A1 | 7/2009 | Staetz |
| 2009/0192290 A1 | 7/2009 | Lambert |
| 2009/0232918 A1 | 9/2009 | Enan |
| 2009/0233940 A1 | 9/2009 | Taylor |
| 2009/0247404 A1 | 10/2009 | Bone |
| 2010/0016158 A1 | 1/2010 | Kilian |
| 2010/0016160 A1 | 1/2010 | Bettarini |
| 2010/0068295 A1 | 3/2010 | Bobbert |
| 2010/0113490 A1 | 5/2010 | Liu |
| 2010/0140368 A1 | 6/2010 | De Lame |
| 2010/0144534 A1 | 6/2010 | Pullen |
| 2010/0144888 A1 | 6/2010 | Bessette |
| 2010/0173781 A1 | 7/2010 | Gobbi |
| 2010/0184855 A1 | 7/2010 | Bernhardt |
| 2010/0197807 A1 | 8/2010 | Giessler-Blank |
| 2010/0234225 A1 | 9/2010 | Dexter |
| 2010/0248962 A1 | 9/2010 | Wilczynski |
| 2010/0285960 A1 | 11/2010 | Gobbi |
| 2010/0298386 A1 | 11/2010 | Burwell |
| 2010/0322990 A1 | 12/2010 | Burke |
| 2011/0003736 A1 | 1/2011 | Narva |
| 2011/0053773 A1 | 3/2011 | Armel |
| 2011/0070198 A1 | 3/2011 | Huang |
| 2011/0086762 A1 | 4/2011 | Fischer |
| 2011/0177944 A1 | 7/2011 | Gewehr |
| 2011/0212187 A1 | 9/2011 | Rabasse |
| 2011/0218104 A1 | 9/2011 | Rodriguez-Kabana |
| 2011/0229589 A1 | 9/2011 | Elraz |
| 2011/0301223 A1 | 12/2011 | Broglie |
| 2011/0306639 A1 | 12/2011 | Qin |
| 2012/0015807 A1 | 1/2012 | Fischer |
| 2012/0015809 A1 | 1/2012 | He |
| 2012/0088661 A1 | 4/2012 | Dietz |
| 2012/0088665 A1 | 4/2012 | Dietz |
| 2012/0094834 A1 | 4/2012 | Frank |
| 2012/0108424 A1 | 5/2012 | Wu |
| 2012/0128648 A1 | 5/2012 | Kaushik |
| 2012/0148503 A1 | 6/2012 | Tamarkin |
| 2012/0148653 A1 | 6/2012 | Jones |
| 2012/0149570 A1 | 6/2012 | Burke |
| 2012/0157317 A1 | 6/2012 | Tanaka |
| 2012/0184434 A1 | 7/2012 | Xu |
| 2012/0232160 A1 | 9/2012 | Kaufman |
| 2012/0244095 A1 | 9/2012 | Konradi |
| 2012/0264603 A1 | 10/2012 | Soane |
| 2012/0295940 A1 | 11/2012 | Sookram |
| 2012/0302442 A1 | 11/2012 | Grobler |
| 2012/0304337 A1 | 11/2012 | Schellenberger |
| 2012/0321587 A1 | 12/2012 | Rosen |
| 2012/0329655 A1 | 12/2012 | Baseeth |
| 2013/0029844 A1 | 1/2013 | Altier |
| 2013/0072384 A1 | 3/2013 | Pohlman |
| 2013/0074404 A1 | 3/2013 | Degaspari |
| 2013/0079228 A1 | 3/2013 | Freed |
| 2013/0136815 A1 | 5/2013 | Jung |
| 2013/0149382 A1 | 6/2013 | Huggett |
| 2013/0150239 A1 | 6/2013 | Premachandran |
| 2013/0203825 A1 | 8/2013 | Premachandran |
| 2013/0247630 A1 | 9/2013 | Reichwein |
| 2013/0309336 A1 | 11/2013 | Auberger |
| 2013/0345051 A1 | 12/2013 | Ugalde Martinez |
| 2014/0026478 A1 | 1/2014 | Degaspari |
| 2014/0080706 A1 | 3/2014 | Schnabel |
| 2014/0086878 A1 | 3/2014 | Strobel |
| 2014/0086879 A1 | 3/2014 | Strobel |
| 2014/0087978 A1 | 3/2014 | Deville |
| 2014/0121103 A1 | 5/2014 | Boudet |
| 2014/0200136 A1 | 7/2014 | Kaiser |
| 2014/0242199 A1 | 8/2014 | Manhas |
| 2014/0255514 A1 | 9/2014 | Li |
| 2014/0256545 A1 | 9/2014 | Velev |
| 2014/0296138 A1 | 10/2014 | Huang |
| 2014/0323305 A1 | 10/2014 | Rheinheimer |
| 2014/0371071 A1 | 12/2014 | Nitsche |
| 2015/0026842 A1 | 1/2015 | Barrentine |
| 2015/0057157 A1 | 2/2015 | Baseeth |
| 2015/0079203 A1 | 3/2015 | Thomas |
| 2015/0118726 A1 | 4/2015 | Wiatr |
| 2015/0126479 A1 | 5/2015 | Premachandran |
| 2015/0140136 A1 | 5/2015 | Bessette |
| 2015/0141360 A1 | 5/2015 | Daly |
| 2015/0147289 A1 | 5/2015 | Bajomi |
| 2015/0157027 A1 | 6/2015 | Harman |
| 2015/0201612 A1 | 7/2015 | Sun |
| 2015/0201623 A1 | 7/2015 | Frank |
| 2015/0225378 A1 | 8/2015 | Liu |
| 2015/0237861 A1 | 8/2015 | Gobbi |
| 2015/0250166 A1 | 9/2015 | Goldblum |
| 2015/0250173 A1 | 9/2015 | Körber |
| 2015/0257383 A1 | 9/2015 | Deisenroth |
| 2015/0274786 A1 | 10/2015 | Bowen |
| 2015/0296801 A1 | 10/2015 | Brahm |
| 2015/0305331 A1 | 10/2015 | Gewehr |
| 2015/0313225 A1 | 11/2015 | Lohmann |
| 2015/0313241 A1 | 11/2015 | Brahm |
| 2015/0327556 A1 | 11/2015 | Brahm |
| 2015/0344445 A1 | 12/2015 | Lohmann |
| 2016/0007595 A1 | 1/2016 | Stern |
| 2016/0073639 A1 | 3/2016 | Rodriguez-Kabana |
| 2016/0083651 A1 | 3/2016 | Phillips |
| 2016/0088835 A1 | 3/2016 | Castelani |
| 2016/0100585 A1 | 4/2016 | Brahm |
| 2016/0108425 A1 | 4/2016 | McGonigle |
| 2016/0108427 A1 | 4/2016 | Baum |
| 2016/0130190 A1 | 5/2016 | Kardasz |
| 2016/0145212 A1 | 5/2016 | Slomczynska |
| 2016/0174552 A1 | 6/2016 | Goldblum |
| 2016/0174631 A1 | 6/2016 | Tong |
| 2016/0183520 A1 | 6/2016 | De Oliveira Filho |
| 2016/0213818 A1 | 7/2016 | Hoang |
| 2016/0227771 A1 | 8/2016 | Sikuljak |
| 2016/0227772 A1 | 8/2016 | Gewehr |
| 2016/0227788 A1 | 8/2016 | Frank |
| 2016/0270405 A1 | 9/2016 | Seevers |
| 2016/0278384 A1 | 9/2016 | Jabs |
| 2016/0319302 A1 | 11/2016 | Bean |
| 2016/0324150 A1 | 11/2016 | Baseeth |
| 2016/0353742 A1 | 12/2016 | Amestica Salazar |
| 2016/0366888 A1 | 12/2016 | Owens |
| 2017/0035053 A1 | 2/2017 | Sceats |
| 2017/0105418 A1 | 4/2017 | Yan |
| 2017/0121377 A1 | 5/2017 | Kennedy |
| 2017/0137634 A1 | 5/2017 | Balasubramanian |
| 2017/0156336 A1 | 6/2017 | Joshi |
| 2017/0181435 A1 | 6/2017 | Nave |
| 2017/0188584 A1 | 7/2017 | Jabs |
| 2017/0208808 A1 | 7/2017 | Lamberth |
| 2017/0215414 A1 | 8/2017 | Bond |
| 2017/0215419 A1 | 8/2017 | Toapanta |
| 2017/0226078 A1 | 8/2017 | Yang |
| 2017/0238537 A1 | 8/2017 | Swietoslawski |

(56) References Cited

U.S. PATENT DOCUMENTS

| | | |
|---|---|---|
| 2017/0238554 A1 | 8/2017 | Saelinger |
| 2017/0238558 A1 | 8/2017 | Hammerschmidt |
| 2017/0251664 A1 | 9/2017 | Zhang |

FOREIGN PATENT DOCUMENTS

| | | |
|---|---|---|
| WO | 1993014639 | 8/1993 |
| WO | 1994023575 | 10/1994 |
| WO | 1995001973 | 1/1995 |
| WO | 1995003702 | 2/1995 |
| WO | 1995011205 | 4/1995 |
| WO | 1996006527 | 3/1996 |
| WO | 1996018297 | 6/1996 |
| WO | 1996019449 | 6/1996 |
| WO | 1996021357 | 7/1996 |
| WO | 1997007103 | 2/1997 |
| WO | 1997007679 | 3/1997 |
| WO | 1997012516 | 4/1997 |
| WO | 1997029093 | 8/1997 |
| WO | 1997044355 | 11/1997 |
| WO | 9804128 | 2/1998 |
| WO | 1998030236 | 7/1998 |
| WO | 1999003348 | 1/1999 |
| WO | 9956548 | 11/1999 |
| WO | 1999055774 | 11/1999 |
| WO | 1999059412 | 11/1999 |
| WO | 0005964 | 2/2000 |
| WO | 2000021364 | 4/2000 |
| WO | 2000053020 | 9/2000 |
| WO | 2000062792 | 10/2000 |
| WO | 0100020 | 1/2001 |
| WO | 0100840 | 1/2001 |
| WO | 2001000033 | 1/2001 |
| WO | 2001000841 | 1/2001 |
| WO | 2001010213 | 2/2001 |
| WO | 2001010214 | 2/2001 |
| WO | 2001013719 | 3/2001 |
| WO | 2001013727 | 3/2001 |
| WO | 2001037662 | 5/2001 |
| WO | 2001047361 | 7/2001 |
| WO | 2001064859 | 9/2001 |
| WO | 2001070025 | 9/2001 |
| WO | 2001072129 | 10/2001 |
| WO | 2001097610 | 12/2001 |
| WO | 2002005620 | 1/2002 |
| WO | 2002008372 | 1/2002 |
| WO | 2002028189 | 4/2002 |
| WO | 2002048100 | 6/2002 |
| WO | 02089573 | 11/2002 |
| WO | 2003029188 | 4/2003 |
| WO | 03056917 | 7/2003 |
| WO | 2003061383 | 7/2003 |
| WO | 2003094614 | 11/2003 |
| WO | 2004004458 | 1/2004 |
| WO | 2004010783 | 2/2004 |
| WO | 2004082358 | 9/2004 |
| WO | 2006008107 | 1/2006 |
| WO | 2007014575 | 2/2007 |
| WO | 2007016223 | 2/2007 |
| WO | 2007067472 | 6/2007 |
| WO | 2007085899 | 8/2007 |
| WO | 2007101543 | 9/2007 |
| WO | 2008040987 | 4/2008 |
| WO | 2008077196 | 7/2008 |
| WO | 2008142707 | 11/2008 |
| WO | 2009103725 | 8/2009 |
| WO | 2009133166 | 11/2009 |
| WO | 2010019141 | 2/2010 |
| WO | 2010046420 | 4/2010 |
| WO | 2010069763 | 6/2010 |
| WO | 2010095151 | 8/2010 |
| WO | 2010103065 | 9/2010 |
| WO | 2010116264 | 10/2010 |
| WO | 2010127796 | 11/2010 |
| WO | 2010139653 | 12/2010 |
| WO | 2010146029 | 12/2010 |
| WO | 2010146032 | 12/2010 |
| WO | 2011010070 | 1/2011 |
| WO | 2011026796 | 3/2011 |
| WO | 2011070392 | 6/2011 |
| WO | 2011099878 | 8/2011 |
| WO | 2011110583 | 9/2011 |
| WO | 2011123290 | 10/2011 |
| WO | 2011124227 | 10/2011 |
| WO | 2011124228 | 10/2011 |
| WO | 2011135121 | 11/2011 |
| WO | 2011151766 | 12/2011 |
| WO | 2012034472 | 3/2012 |
| WO | 2012051699 | 4/2012 |
| WO | 2012084670 | 6/2012 |
| WO | 2012107266 | 8/2012 |
| WO | 2012127009 | 9/2012 |
| WO | 2013003977 | 1/2013 |
| WO | 2013007168 | 1/2013 |
| WO | 2013027221 | 2/2013 |
| WO | 2013110594 | 8/2013 |
| WO | 2013156492 | 10/2013 |
| WO | 2013189801 | 12/2013 |
| WO | 2014049546 | 4/2014 |
| WO | 2014063942 | 5/2014 |
| WO | 2014079724 | 5/2014 |
| WO | 2014079728 | 5/2014 |
| WO | 2014079730 | 5/2014 |
| WO | 2014079752 | 5/2014 |
| WO | 2014079754 | 5/2014 |
| WO | 2014079766 | 5/2014 |
| WO | 2014079769 | 5/2014 |
| WO | 2014079770 | 5/2014 |
| WO | 2014079771 | 5/2014 |
| WO | 2014079772 | 5/2014 |
| WO | 2014079774 | 5/2014 |
| WO | 2014079804 | 5/2014 |
| WO | 2014079813 | 5/2014 |
| WO | 2014079841 | 5/2014 |
| WO | 2014086848 | 6/2014 |
| WO | 2014086850 | 6/2014 |
| WO | 2014086851 | 6/2014 |
| WO | 2014086853 | 6/2014 |
| WO | 2014086854 | 6/2014 |
| WO | 2014086856 | 6/2014 |
| WO | 2014137605 | 9/2014 |
| WO | 2014180020 | 11/2014 |
| WO | 2014182627 | 11/2014 |
| WO | 2014183415 | 11/2014 |
| WO | 2015011615 | 1/2015 |
| WO | 2015028942 | 3/2015 |
| WO | 2015051572 | 4/2015 |
| WO | 2015055497 | 4/2015 |
| WO | 2015055757 | 4/2015 |
| WO | 2015075409 | 5/2015 |
| WO | 2015093659 | 6/2015 |
| WO | 2015135360 | 9/2015 |
| WO | 2015142757 | 9/2015 |
| WO | 2015147263 | 10/2015 |
| WO | 2015177021 | 11/2015 |
| WO | 2015181035 | 12/2015 |
| WO | 2015183062 | 12/2015 |
| WO | 2015186893 | 12/2015 |
| WO | 2016002790 | 1/2016 |
| WO | 2016010439 | 1/2016 |
| WO | 2016045988 | 3/2016 |
| WO | 2016046078 | 3/2016 |
| WO | 2016050726 | 4/2016 |
| WO | 2016071246 | 5/2016 |
| WO | 2016113289 | 7/2016 |
| WO | 2016116797 | 7/2016 |
| WO | 2016118699 | 7/2016 |
| WO | 2016124927 | 8/2016 |
| WO | 2016128240 | 8/2016 |
| WO | 2016128261 | 8/2016 |
| WO | 2016128266 | 8/2016 |
| WO | 2016131133 | 8/2016 |
| WO | 2016145908 | 9/2016 |
| WO | 2016170531 | 10/2016 |

(56) References Cited

FOREIGN PATENT DOCUMENTS

| WO | 2016180655 | 11/2016 |
| WO | 2016180658 | 11/2016 |
| WO | 2016184378 | 11/2016 |
| WO | 2016207097 | 12/2016 |
| WO | 2017025433 | 2/2017 |
| WO | 2017027431 | 2/2017 |
| WO | 2017050428 | 3/2017 |
| WO | 2017059090 | 4/2017 |
| WO | 2017063973 | 4/2017 |
| WO | 2017093163 | 6/2017 |
| WO | 2017100856 | 6/2017 |
| WO | 2017132204 | 8/2017 |
| WO | 2017135918 | 8/2017 |
| WO | 2017146899 | 8/2017 |

* cited by examiner

INSECTICIDE FOR FLIGHT-CAPABLE PESTS

REFERENCE TO RELATED APPLICATION

This application claims priority to U.S. Provisional Application No. 62/689,067, filed Jun. 23, 2018, and U.S. Provisional Application No. 62/605,576 filed Aug. 18, 2017, both of which are hereby incorporated by reference in their entirety, including their appendices.

FIELD OF INVENTION

The present invention relates, generally, to an insecticide for flight-capable pests, and, more specifically, to an insecticide for spotted lanternflies (lycorma delicatula) and other invasive pests.

BACKGROUND

The spotted lanternfly is an invasive pest. It has the potential to significantly damage tress and crops, and greatly impact related industries such as orchards and logging. Infested trees develop weeping wounds as the insects extract vital nutrients from the trees and leave toxins behind. These wounds not only leave a greyish or black trail along the trunk, but also leave the tree susceptible to disease and harmful pests as the sap attracts other insects to feed.

The lanternfly needs to be exterminated in its nonindigenous habitat. However, the lanternfly is difficult to kill. One approach, advocated by the Department of Natural Resources of Pennsylvania involves knocking the insects to the ground and stomping on them. Unfortunately, the lanternfly is capable of flight. (It should be understood that although the lanternfly has wings, it does not fly in the traditional sense. Rather, with a combination of jumping and the use of its wings, the lanternfly can travel a significant distance in the air. Accordingly, as used herein, the term "flight-capable" refers to insects that both fly in the traditional sense, such as houseflies, and those that jump a distance many times their size, such as, for example, fleas and lanternflies.) If one attempts to physically step on lanternflies or otherwise crush them, they take flight immediately traveling 20 yards or so away. Thus, knocking a lanternfly down and stepping on it is simply not practical.

Another approach of exterminating these insects involves the use of powerful insecticides. For example, Multicide Wasp & Hornet Spray 20863, Dinotefuran, and Permethrin have been shown to be effective. Although effective, these insecticides pose environmental risks. Indeed, these insecticides have been used in such quantities that they are no longer deemed environmentally safe. Dinotefuran, for example, has been shown to be detrimental to bees, perhaps contributing to the collapse of bee colonies. Additionally, the application of these insecticides typically requires a licensed professional. Still another problem with these insecticides is that they often take time to kill the insect. For example, Dinotefuran takes hours to kill the lanternfly.

Therefore, what is needed is a non-toxic, environmentally-safe insecticide that can be applied by nonprofessionals to kill the lanternfly (and possibly other flight-capable pests) immediately. The present invention fulfills this need among others.

SUMMARY

The following presents a simplified summary of the invention to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to an all-natural, non-toxic insecticide for flight-capable insects such as the lanternfly. Applicant has observed that insects similar to the lanternfly, for example fruit flies, are repulsed by menthol. Without being tied to a particular theory, Applicant suspects that menthol, may be lethal to certain insects including the lanternfly. Additionally, menthol has other biological properties that may retard the insect's ability to move/fly. Accordingly, in one embodiment, the insecticide of the present invention includes menthol, which may be supplied in different forms, e.g., menthol crystals or peppermint oil. In one embodiment, Applicant also disguises the menthol vapors to avoid the insect immediately detecting the presence of menthol and being repelled before the insecticide has a chance to adhere to it. According, in one embodiment, the insecticide incorporates masking agents to reduce or disguise the menthol vapors.

Applicant also recognizes that the insecticide needs to be formulated to stick to the insect, rather than simply cause it to flee. Accordingly, the insecticide of the present invention includes surfactants and viscosity-increasing agents to improve the adhesion of the insecticide to the insects' body and wings. In one embodiment, the insecticide is configured to adhere to the wings/body of the insect in sufficient quantities to weight the insect down and eliminate its ability to fly.

Thus, while the invention is not tied to particular theory, Applicant has formulated in insecticide which acts to kill flight-capable insects through a combination of factors including a high-viscosity fluid to adhere to the wings and body of the insect, mobility inhibiting properties to retard its movement/flight, and finally lethal properties to kill the insect quickly. All of this is provided in an all-natural, non-toxic formulation.

Accordingly, in one embodiment, the present invention comprises an insecticide comprising: (a) An effective amount of peppermint oil to be lethal to said insect; (b) a solvent for said peppermint oil; (c) at least one viscosity-increasing agent in sufficient concentration to increase viscosity of insecticide to greater than 5 centipoise; (d) at least one surfactant in sufficient amounts to promote adhesion of insecticide to flight-capable insect; and (e) a volumizer.

In another embodiment, the present invention comprises a method of using an insecticide for exterminating flight-capable insects, said method comprising: spraying said insecticide on an area containing one or more of said insects to apply said insecticide at least on the top of at least a portion of said insects, said insecticide comprising: (a) an effective concentration of menthol to be lethal to said insect; (b) a solvent for said menthol; (c) at least one viscosity-increasing agent in sufficient concentration to increase viscosity of insecticide to greater than 14 centipoise; (d) at least one surfactant in sufficient concentration to cause adhesion of the insecticide to said insect; and (e) a volumizer.

DETAILED DESCRIPTION

In one embodiment, the insecticide for exterminating flight-capable insects comprises: (a) an effective amount of peppermint oil to be lethal to said insect; (b) a solvent for said peppermint oil; (c) at least one viscosity-increasing agent in sufficient concentration to increase viscosity of insecticide to greater than 5 centipoise; (d) at least one surfactant in sufficient amounts to promote adhesion of insecticide to flight-capable insect; and (e) a volumizer. These elements are described in greater detail below. All percentages disclosed herein are percentage by weight, unless otherwise noted.

An important component of the insecticide is menthol. As used herein, the term "menthol" refers generally to menthol and its related isomers/stereoisomers. In one embodiment, menthol is the naturally-occurring compound in which the isopropyl group is in the trans orientation to both the methyl and the hydroxyl groups, although embodiments in which menthol comprises one of the isomers/stereoisomers or a combination of isomers/stereoisomers are within the scope of this disclosure.

Without being tied to any particular theory, Applicant believes that menthol serves multiple purposes. First, insects are repulsed by it, suggesting to Applicant that menthol is in some way harmful to them. Through experimentation, Applicant confirmed that indeed menthol is lethal to flight-capable insects such as the lanternfly. Additionally, menthol appears to inhibit the insect's ability to take flight. Again, without being tied to any particular theory, Applicant suspects that menthol's biological properties, such as its cooling effect and analgesic properties, inhibit the insect's movement.

The concentration of menthol in the insecticide should be sufficient such that it is lethal to the insect. As used herein, the term "lethal" means that, once applied by spraying the top of the insect, the insect dies within 10 minutes. Those of skill in the art can determine a lethal dose of menthol without undue experimentation. Although higher doses tend to result in a shorter kill time, given the expense of menthol, it is generally preferred to minimize its concentration to achieve a sufficient kill time, i.e., less than 10 minutes and preferably less than 2 minutes, and more preferably less than 1 minute.

Surprisingly, Applicant found that even at very low concentrations—e.g., less than 5%—menthol is lethal to the lanternfly and as low as 0.1%. In one embodiment, the concentration of menthol is at least 0.1%, or at least 0.3% or at least 0.5%, or at least 0.8%. Generally, the lowest lethal dose for a desired kill time is preferred to reduce cost/ minimize pollution. Additionally, if the concentration of menthol is less than wt. 5%, then there is no need for regulatory documentation when shipping the insecticide. Therefore, in one embodiment, the concentration of menthol is less than 5%. In one embodiment, the concentration of menthol is less than 5%, or no greater than 3%, or no greater than 2%, or no greater than 1.5%.

Menthol is commercially available in different forms. For example, in one embodiment, menthol is in the form of peppermint oil. Peppermint oil is well known and commercially available from a number of different sources. Although the composition of peppermint oil can vary, in one embodiment it comprises menthol (41%) and menthone (23%) and may also contain (+/−)-menthyl acetate, 1,8-cineole, limonene, beta-pinene and beta-caryophyllene. It is non-toxic and non-flammable and can be shipped without special documentation. Alternatively, menthol can be provided in crystal form.

In one embodiment, a concentration of peppermint oil greater than 0.5% has been shown to be lethal. In a more particular embodiment, the concentration of peppermint oil is about 0.5% to 10%, and, in still a more particular embodiment, it is about 1% to 5%, and, in even a more particular embodiment, it is about 2% to 4%.

In one embodiment, the menthol is dissolved in a solution. The solvents used to dissolve menthol can vary based on the application. Those of skill in the art will understand which solvents may be used to dissolve menthol in light of this disclosure. Generally, although not necessarily, non-toxic and nonflammable solvents are preferred. In one embodiment, the solvent is an oil, for example, mineral oil, caster or canola oil. Alternatively, the solvent can be an alcohol, for example, ethanol, methanol or isopropanol. In one embodiment, the alcohol is isopropanol due to its low cost, availability, and low risk of being used for improper means (i.e. human consumption).

Aside from dissolving the menthol, the solvent may be chosen for other properties as well. For example, the solvent can be chosen to cooperate with industrial/agricultural/ commercial spraying equipment to aid in the spraying/ lubrication or application of the insecticide. Those of skill in the art will be able to identify suitable solvents that not only dissolve menthol, but also can facilitate the application of the insecticide and/or lubricate the spraying equipment. In yet another embodiment, a solvent is used that has high volatility such that it has a cooling effect for inhibiting the insect's mobility. (A solvent with high volatility, such as alcohol, will tend to vaporize (i.e. evaporate) readily, especially in higher summer temperatures, thus cooling the surface on which it is applied—i.e. the insect's body.)

Although alcohols are effective solvents and their high volatility enhances evaporation and, thus, the insecticide's cooling effect, their use tends to be more controlled and restrictive, and, in sufficient concentrations, their flammability may be an issue. Therefore, in a preferred embodiment, an oil solvent is used, however, it should be understood, that the invention is not limited to such a solvent.

In addition to menthol, the insecticide may include other lethal components. For example, Applicant has identified naturally-occurring panthenol—i.e., vitamin B as also being lethal to flight-capable insects. Again, without being bound to a particular theory, Applicant believes that vitamin B acts as a nerve agent or other harmful agent to aid in the killing of the insect. Applicant has found that relatively small quantities of vitamin B are effective in killing insects. For example, in one embodiment, a concentration of 0.1% to 5% vitamin B has been found lethal. As with the menthol, generally it is preferred to use the minimum effective quantity to minimize costs and to avoid contamination/ pollution.

In one embodiment, the insecticide includes adhesion agents/surfactants. Specifically, Applicant has discovered that the effectiveness of the insecticide is increased dramatically if surfactants are used to increase the adhesion of the insecticide to the insect's body and wings. Applicant recognizes that the ability of the insecticide to stick to the insect is important not only to inhibit its flight, but also to increase the contact of the insecticide to the body of the insect and thereby increase the effective dose of menthol being delivered to the insect.

Those of skill in the art will appreciate suitable surfactants and other adhesion agents for improving the adhesive properties of the insecticide. For example, in one embodiment, the surfactant is a non-toxic, commercially available product used, for example, in soaps and other healthcare/cosmetic products. In one particular embodiment, the surfactant is sodium lauryl sulfate. One of skill in the art in light of this disclosure can readily determine an optimal amount of surfactant to use, although, generally, the concentration will range from 1 to 5%. Applicant has found that 2% sodium lauryl sulfate provides adequate cohesion. Other suitable surfactants include, for example, sodium laureth sulfate.

In yet another embodiment, the insecticide of the present invention includes a viscosity-increasing agent for increasing the viscosity of the insecticide. The higher viscosity of the insecticide of the present invention along with its adhesion synergistically eliminate the insect's ability to fly. Specifically, by having a relatively thick insecticide that sticks to the insect, the insect's mobility, and particularly its flight, is immediately impaired, while the toxic effect of the insecticide is enhanced through the insecticide's adhesion to the body.

Those of skill in the art will appreciate different viscosity-increasing agents to increase the viscosity to sufficient levels. Although relatively high viscosity insecticides are preferred, it should also be appreciated that the insecticide must be capable of being sprayed which militates in favor of less viscosity. Those of skill in the art will be able to optimize the viscosity in light of this disclosure. Again, what is sufficient may vary among the different insects to be exterminated, however, in the case of lanternfly, for example, a viscosity of about 4-14, or about 7-11, or about 8 centipoise has been found to be very effective in impairing the insect's flight while still allowing the insecticide to be sprayed. One of skill in the art can readily identify suitable viscosity increasing agents in light of this disclosure. For example, in one embodiment, the glycerin is used to increase the viscosity. Other suitable viscosity-increasing agents include, for example, light corn syrup.

The concentration of the viscosity increasing agent will vary according to the application, although Applicant has found that a concentration between 5 and 12%, and more particularly between 8 and 10% provides suitable results.

In one embodiment, the viscosity-increasing agent and the surfactant are present in sufficient concentration to cause a quantify of insecticide at least equal to the weight of the insect to adhere to the insect when the insect is sprayed from its top.

In yet another embodiment, a spreading agent, or otherwise known as a rheology agent, is used to improve the spreading of the insecticide on the insect body, particularly the wings. Those of skill in the art will be able to determine appropriate spreading agents in light of this disclosure. For example, in one embodiment, the agent is dimethicone. The concentration of the spreading agent can vary according to application which is readily determined by one of ordinary skill in the light of this disclosure.

In still another embodiment, the insecticide comprises a component to lower the pH as Applicant has found that an acidic formulation is more effective. Although the pH can vary, in one embodiment, the pH is less than 5, and, in a more particular embodiment, the pH is less than 4, and, in still a more particular embodiment, the pH is between 3 and 3.5. Again, one of skill in the art, in light of this disclosure, will be able to identify suitable pH modifiers. Generally, although not necessarily, non-toxic acids are preferred. For example, the pH modifier may be lemon juice (citric acid) or vinegar (acetic acid). Still other naturally-occurring acids will be obvious to those of skill in the art. The concentration of the pH modifier will vary according to the application. For example, in one embodiment, the concentration of vinegar and/or lemon juice ranges from 0.2 to 2%. Again, one of ordinary skill in the art can really determine the appropriate concentration without undue experimentation.

In one embodiment, a material is used which not only controls the pH, but also effectively masks the menthol vapors. For example, lemon juice and vinegar are not only acidic, but also fragrant and effective at masking the menthol scent. In still another embodiment, the insecticide may include other fragrances to mask the menthol from humans and from the insects/pests.

The insecticide of the present invention also comprises the volumizer to facilitate its homogeneous application to a large area, which is important when spraying insects. In one embodiment, the volumizer is water.

One of skill in the art may appreciate that the various components disclosed herein may not be miscible. For example, peppermint oil dissolved in mineral oil is not miscible in water and thus this the mixture may be two or more phases. In one embodiment, this issue is resolved by simply shaking the container containing the mixture prior to its application/spraying. Alternatively, emulsifiers may be used to mix the two phases. Because the insecticide also comprises a large component of water, and other ingredients, to improve the miscibility of the menthol solution in the insecticide, in one embodiment, an emulsifier is used to avoid phase separation between the solvent and aqueous phases. Again, the choice of the emulsifier will be obvious to those of skill in the art in light of this disclosure. In one embodiment, the emulsifier is propylene glycol.

In one embodiment, the formation is packaged for the consumer in a ready-to-use. bottle with sprayer (e.g., HDPE 16 fl. Oz). This makes transporting the invention to the specific infestation site that it is needed very simple as the bottle and mixture are portable. The hand activated pump sprayer does not require a compressor or electricity to deliver the solution and unlike other available pesticides does not require water pressure and can therefore be used beyond the reach of a regular household garden hose. The instructions for application of the solution are printed on the label, the consumer can adjust the nozzle for control of the stream or spray shot, shake gently before using, and then apply the mixture by aiming and spraying directly at the spotted lanternfly. This minimizes unintentional contact with non-target species. It is recommended that the end user wait 24 hours between applications so that any spotted lanternflies not lethally contacted (e.g., shielded by vegetation or not visible to consumer) will return and be eliminated with the second application. In one embodiment, the mixture is sold in the optimized concentration for efficacy, thus environmental consequences of improper dilution by the end user are avoided. (Several massive bee kills have occurred in the United States as a result of misuse of pesticides because of improper dilution.)

EXAMPLES

The following nonlimiting examples illustrate the effectiveness of the insecticide of the present invention. Specifically, as indicated in Table 1, various formulations were produced using peppermint oil along with varying concentrations of other components such as solvents, volumizers, surfactants, viscosity-increasing agents, and pH modifiers as described therein. In all cases, the formulations were applied to lantern flies to test the effectiveness of the particular formulation, and, in all cases, the formulations were lethal as defined in this application.

Of particular interest is the reduction in the flashpoint of sample 17 compared to that of sample 16. Specifically, sample 16 had a flash point of 37 C, a pH of 3.42, while sample 17 had a flash point of 100 C, which is considered not hazardous. Additionally, sample 17 had a lower pH of 3.03. As mentioned above, the solvent for the peppermint oil can be varied according to the application. In samples 18 and 20, the mineral oil was replaced with canola oil. Finally, the pH for samples 18 and 19 are 3.38 and 3.33 respectively.

TABLE 1

Spotted lanternfly research: versions

| | # | Ingredient | 20 Aug. 1, 2018 % | 19 Jul. 30, 2018 % | 18 Jul. 24, 2018 % | 17 FIFRA exempt Jul. 13, 2018 % | 16 Jul. 5, 2018 % | 15 Jul. 4, 2018 % | 14 PO Jun. 27, 2018 % |
|---|---|---|---|---|---|---|---|---|---|
| 67-63-0 | 1 | Isopropyl Alcohol 70 | 0 | 0 | 0 | — | 12.7 | 13.9 | 13.9 |
| 8006-90-4 | 2 | Peppermint Oil | 2.0 | 2.0 | 4.5 | 4.5 | 4.5 | 4.4 | 4.5 |
| 8042-47-5 | 3 | Mineral Oil | 0* | 2.0 | 0* | 4.5 | 2.3 | 2.1 | 2.1 |
| 7732-18-5 | 4 | Distilled Water | 83.3 | 83.3 | 80.3 | 80.0 | 70.2 | 69.9 | 69.4 |
| 56-81-5 | 5 | Glycerin | 10.0 | 10.0 | 8.0 | 8.0 | 5.9 | 5.8 | 5.7 |
| 151-21-3 | 6 | sodium lauryl sulfate | 2.0 | 2.0 | 2.0 | 2.0 | 2.1 | 2.0 | 2.1 |
| 64-19-7 | 7 | vinegar | 0 | 0 | 0 | — | 1.8 | 1.5 | 1.8 |
| 5949-29-7 | 8 | lemon juice | 0.7 | 0.7 | 0.7 | 1.0 | 0.5 | 0.4 | 0.5 |
| | | | 100% | 100% | 100% | 100% | 100% | 100% | 100% |

Alternatively, as indicated in Table 2 below, various formulations were produced using menthol crystals along with varying concentrations of other components such as solvents, volumizers, surfactants, viscosity-increasing agents, and pH modifiers as described therein. Again, in all cases, the formulations were applied to lantern flies to test the effectiveness of the particular formulation, and, in all cases, the formulation were lethal as defined in this application.

TABLE 2

14
Jun. 25, 2018

| # | CAS # | Ingredient | % |
|---|---|---|---|
| 1 | 67-63-0 | Isopropyl Alcohol 70 | 13.9 |
| 2 | 2216-51-5 | Menthol Crystals | 4.5 |
| 3 | 8042-47-5 | Mineral Oil | 2.1 |
| 4 | 7732-18-5 | Distilled Water | 69.4 |
| 5 | 56-81-5 | Glycerin | 5.7 |
| 6 | 151-21-3 | sodium lauryl sulfate | 2.1 |
| 7 | 64-19-7 | vinegar | 1.8 |
| 8 | 5949-29-7 | fresh squeezed lemon juice | 0.5 |
| | | | 100% |

As indicated in Table 3 below, alternative formulations were produced using menthol crystals along with a secondary lethal agent, vitamin B, and varying concentrations of other components such as solvents, volumizers, surfactants, viscosity-increasing agents, and pH modifiers as described therein. Again, in all cases, the formulations were applied to lantern flies to test the effectiveness of the particular formulation, and, in all cases, the formulation were lethal as defined in this application.

TABLE 3

| Human Skin Lotion | 12N Jun. 8, 2018 | 3 Sep. 2, 2016 | |
|---|---|---|---|
| Isopropyl Alcohol 70 | 13.65 | 18.00 | 67-63-0 |
| Menthol Crystals | 4.19 | 9.60 | 2216-51-5 |
| Propylene Glycol | 3.43 | 0.00 | 57-55-6 |
| Dimethicone | 1.90 | 3.20 | 9006-65-9 |
| Mineral Oil | 0.00 | 0.00 | |
| Fragrance | 0.03 | 0.00 | |
| Distilled Water | 66.64 | 58.80 | 7732-18-5 |
| Glycerin | 5.08 | 0.00 | 56-81-5 |
| sodium lauryl sulfate | 2.16 | 4.00 | 151-21-3 |
| vinegar | 1.90 | 0.00 | 64-19-7 |
| Vitamin B (DL Panthenol) | 0.51 | 1.60 | 16485-10-2 |
| fresh squeezed lemon juice | 0.51 | 0.00 | 5949-29-7 |
| Cyclomethicone | 0.00 | 4.80 | 541-02-6 |
| | 100% | 100% | |

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An insecticide for exterminating a flight-capable insect, said insecticide comprising:
   an effective concentration of menthol to be lethal to said insect;
   a solvent for said menthol;
   at least one viscosity-increasing agent in sufficient concentration to increase viscosity of insecticide to greater than 5 centipoise;
   at least one surfactant in sufficient concentration to cause adhesion of said insecticide to said insect;
   a volumizer; and
   at least one pH controller in sufficient concentration such that pH of said insecticide is below 4.

2. The insecticide of claim 1, wherein said insecticide is non-toxic.

3. The insecticide of claim 1, wherein said insecticide comprises only naturally-occurring materials.

4. The insecticide of claim 1, wherein said concentration of menthol is at least 0.3%.

5. The insecticide of claim 1, wherein said concentration of menthol is less than 5%.

6. The insecticide of claim 1, wherein said menthol is in the form of peppermint oil.

7. The insecticide of claim 1, wherein the concentration of peppermint oil is 1% to 5%.

8. The insecticide of claim 1, wherein said volumizer is water.

9. The insecticide of claim 1, wherein said viscosity-increasing agent and said surfactant are present in sufficient concentration to cause a quantify of insecticide at least equal to the weight of said insect to adhere to said insect when said insect is sprayed from its top.

10. The insecticide of claim 1, wherein said viscosity-increasing agent is glycerin.

11. The insecticide of claim 1, wherein said surfactant is sodium lauryl sulfate.

12. The insecticide of claim 1, wherein said pH controller is lemon juice.

13. The insecticide of claim 12, wherein said pH controller masks menthol.

14. The insecticide of claim 1, further comprising: an emulsifier to prevent phase separation of said solvent and aqueous phases.

\* \* \* \* \*